UNITED STATES PATENT OFFICE.

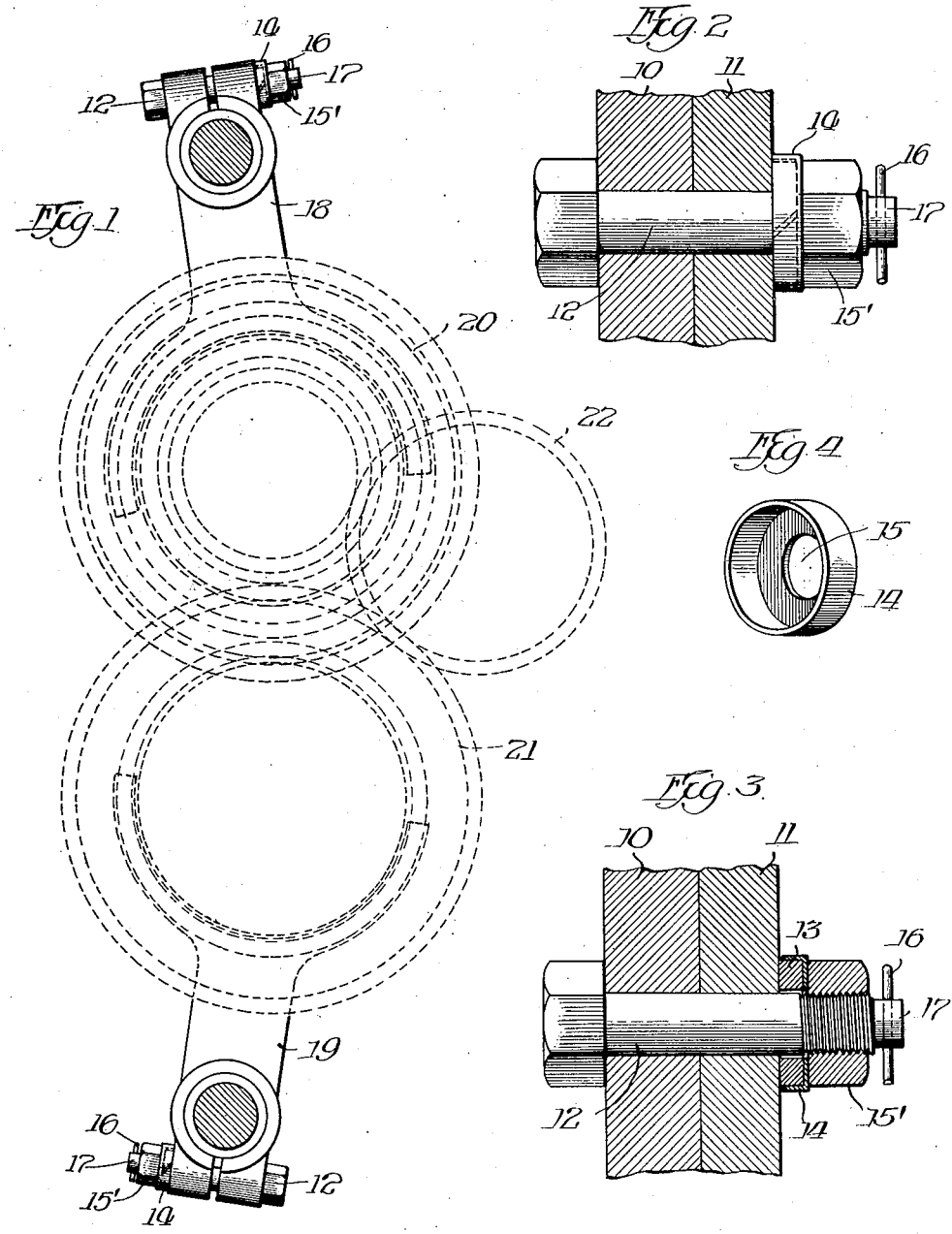

JOHN RIISE, OF DOYLESTOWN, OHIO.

BOLT-FASTENING MECHANISM.

1,355,503.  Specification of Letters Patent.  Patented Oct. 12, 1920.

Application filed July 3, 1919. Serial No. 308,505.

*To all whom it may concern:*

Be it known that I, JOHN RIISE, a subject of the King of Norway, residing at Doylestown, in the county of Wayne and State of Ohio, have invented certain new and useful Improvements in Bolt-Fastening Mechanism, of which the following is a specification.

This invention relates to bolt fastening mechanism, and more particularly to a combination of parts including means whereby the broken parts of a lock washer, if the washer becomes broken, are retained and prevented from falling into moving machinery, which might result in damage thereto.

Therefore, the main object of my invention is to provide means for preventing broken parts of a lock washer from falling into machinery and causing damage thereto.

Another object is to provide a combination of parts, including a lock washer cup operatively associated with the lock washer, to retain broken parts of the latter, in the event that said washer does become broken, from falling into moving machinery and causing damage thereto.

These and other objects are accomplished by means of the arrangement disclosed on the accompanying sheet of drawings, in which—

Figure 1 shows my invention as applied to relatively moving parts, such as gears, the lock washer cup being shown surrounding the washer on each of the bolts;

Fig. 2 is an enlarged view of the lock fastening mechanism, including the lock washer and lock washer cup;

Fig. 3 is a sectional view, showing the same parts as shown in Fig. 2; and

Fig. 4 is a perspective view of the lock washer cup.

In Figs. 2 and 3, 10 and 11 represent two parts which are connected together. These may be any two members. A bolt passes through registering openings in the members 10 and 11 and has mounted thereupon a spring lock washer 13, which engages one side of the member 11. Surrounding the lock washer and mounted upon the bolt 12 is a lock washer cup 14, having an aperture 15, through which the bolt 12 extends. This lock washer cup has a continuous uninterrupted annular flange portion to prevent any part or parts of the spring from falling from said cup in the event that the spring becomes broken.

The function of the lock washer cup is to prevent parts of a lock washer from falling into relatively moving machinery parts in the event that the lock washer becomes broken. Such broken parts may cause considerable damage to relatively moving parts, and, in order to safeguard machinery, I have provided the lock washer cup which embraces the lock washer for preventing any such disastrous occurrence. The lock washer cup is held in coöperative association with the lock washer by a nut 15′. To prevent the nut from accidentally working loose beyond a predetermined amount, a cotter-pin 16 is passed through the reduced end portion 17 of the bolt 12.

This lock washer cup arrangement is primarily useful in connection with inside construction, such as transmission gears, ball bearings, and other rotating parts. In Fig. 1, my invention is shown as applied to gear shifters 18 and 19, which are operatively associated with gears 20 and 21 respectively, and which have meshing relationship with another gear 22.

The lock washer is not used for locking a nut by digging its ends into the nut or the part against which it is seated. When a washer is used in such manner, it affords a poor seat for the nut, and if it is desired to remove the latter or its associated bolt, damage is done either to the nut or the part against which it seats.

The lock washer 13 here shown is used to create a tension or clamping action between the parts bolted together and the nut. In case the nut 15′ should back off a couple of turns, there is still tension left, due to the lock washer, which in any case prevents rattling or vibration of the parts which are under this tension. The tension due to lock washer also creates a friction of the nut and screw-threads against each other, causing a smaller tendency to come off. In addition to the nut for holding the lock washer cup in operative association with the lock washer, the cotter-pin 16 is also used outside of the nut, so that in the event that the latter should start working loose, its loosening movement will be limited by the cotter-pin.

This combination of members makes it impossible for broken lock washer parts to fall out and do damage, for the reason that the cup will retain such broken parts, the cup being held in place by the nut and the latter by the cotter-pin.

I claim—

In bolt fastening mechanism, the combination of a bolt passing through parts to be connected, a lock washer mounted on said bolt, a cup having a continuous portion surrounding said washer to retain broken parts of the latter if the same becomes broken and having a nut engaging flange, and a nut engaging said flange for retaining said cup in coöperative position with respect to said washer.

Signed at Chicago, Illinois, this 26th day of June, 1919.

JOHN RIISE.